(12) United States Patent
Matsueda

(10) Patent No.: US 12,038,035 B2
(45) Date of Patent: Jul. 16, 2024

(54) THREADED FASTENER

(71) Applicant: TOPURA CO., LTD., Hadano (JP)

(72) Inventor: Youichi Matsueda, Hadano (JP)

(73) Assignee: TOPURA CO., LTD., Hadano (JP)

( * ) Notice: Subject to any disclaimer, the term of this patent is extended or adjusted under 35 U.S.C. 154(b) by 296 days.

(21) Appl. No.: 17/217,056

(22) Filed: Mar. 30, 2021

(65) Prior Publication Data

US 2021/0301861 A1 Sep. 30, 2021

(30) Foreign Application Priority Data

Mar. 31, 2020 (JP) ................. 2020-063022

(51) Int. Cl.
*F16B 43/00* (2006.01)
*F16B 23/00* (2006.01)
*F16B 35/04* (2006.01)

(52) U.S. Cl.
CPC ........ *F16B 43/001* (2013.01); *F16B 23/0084* (2013.01); *F16B 35/041* (2013.01)

(58) Field of Classification Search
CPC ..................................................... F16B 43/001
See application file for complete search history.

(56) References Cited

U.S. PATENT DOCUMENTS 4,026,183 A * 5/1977 Bart ...................... F16B 43/001
411/542
5,906,463 A 5/1999 Damm et al.

2015/0247524 A1 9/2015 Utsuno et al.
2016/0305466 A1 10/2016 Kawashima et al.
2017/0268547 A1* 9/2017 Mori ........................ F16B 43/00
2018/0058494 A1 3/2018 Fujihara et al.

FOREIGN PATENT DOCUMENTS

| CN | 103958908 A | | 7/2014 | |
|---|---|---|---|---|
| CN | 105765238 A | | 7/2016 | |
| CN | 107781270 A | | 3/2018 | |
| EP | 0730101 A1 | | 9/1996 | |
| GB | 739490 A | * | 11/1955 | ............ F16B 43/001 |
| GB | 813048 A | * | 5/1959 | ............ F16B 33/004 |

(Continued)

OTHER PUBLICATIONS

Machine translation of WO-2014061122-A1 (Year: 2014).*

(Continued)

*Primary Examiner* — Kyle A Cook
(74) *Attorney, Agent, or Firm* — Harness, Dickey & Pierce, P.L.C.

(57) ABSTRACT

A threaded fastener includes a bolt and a washer. The washer has a washer main body and a seal member provided at an outer peripheral side of the washer main body. The washer is caulked and fixed to a shank portion of the bolt in a water stop state, and the seal member is in contact with a fastened member in a water stop state, with a bearing surface of the washer main body held in contact with the fastened member. The seal member is provided on its outer periphery with a protrusion portion that protrudes outward beyond a radially outer end of a contact portion of the seal member with the washer in a no-load state. A back surface of the protrusion portion on the opposite side of the fastened member is an inclined surface.

17 Claims, 8 Drawing Sheets

(56) References Cited

FOREIGN PATENT DOCUMENTS

| | | | |
|---|---|---|---|
| JP | 652-024188 A | 2/1977 | |
| JP | 52-24188 * | 6/1977 | |
| JP | S60-003304 U | 1/1985 | |
| JP | 2001-317631 A | 11/2001 | |
| JP | 2009-209985 A | 9/2009 | |
| JP | 2013-002621 A | 1/2013 | |
| JP | 2015-121316 A | 7/2015 | |
| JP | 2018-059595 A | 4/2018 | |
| WO | WO-2014061122 A1 * | 4/2014 | ............ F16B 41/002 |
| WO | WO2014061122 A1 | 9/2016 | |

OTHER PUBLICATIONS

Machine translation of EP0730101 (Year: 1996).*
Machine translation of JP52-24188 (Year: 1977).*
Chinese Office Action dated Jul. 5, 2022 (corresponding to CN 202110339118.7).
Japanese Office Action dated Jul. 20, 2020 with English Machine Translation (corresponding to JP 2020-063022).

* cited by examiner

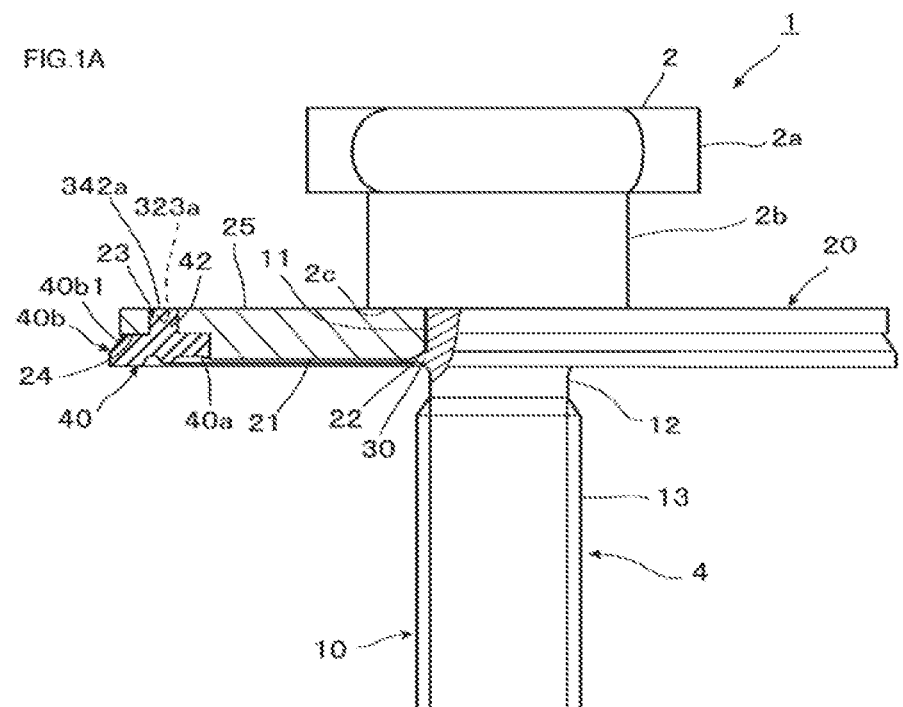
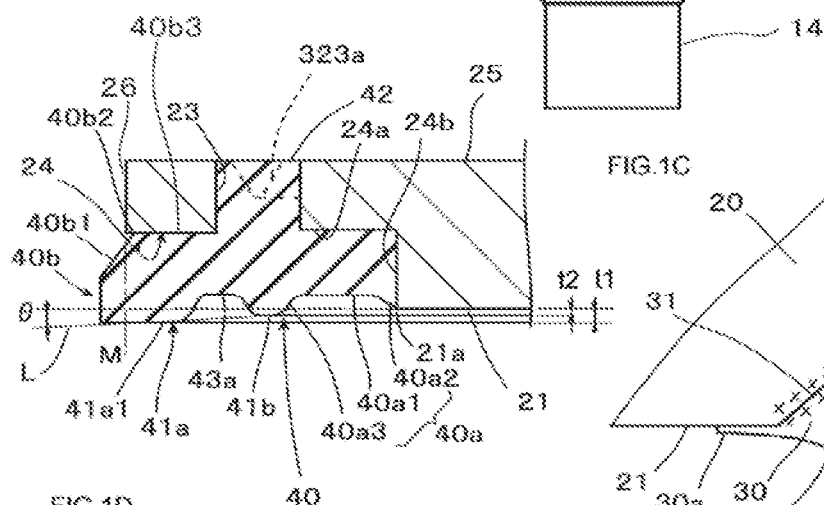
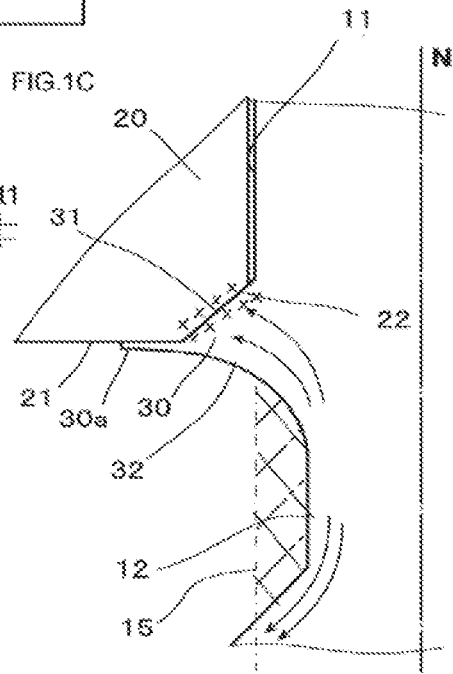
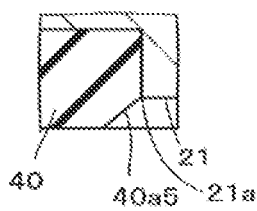

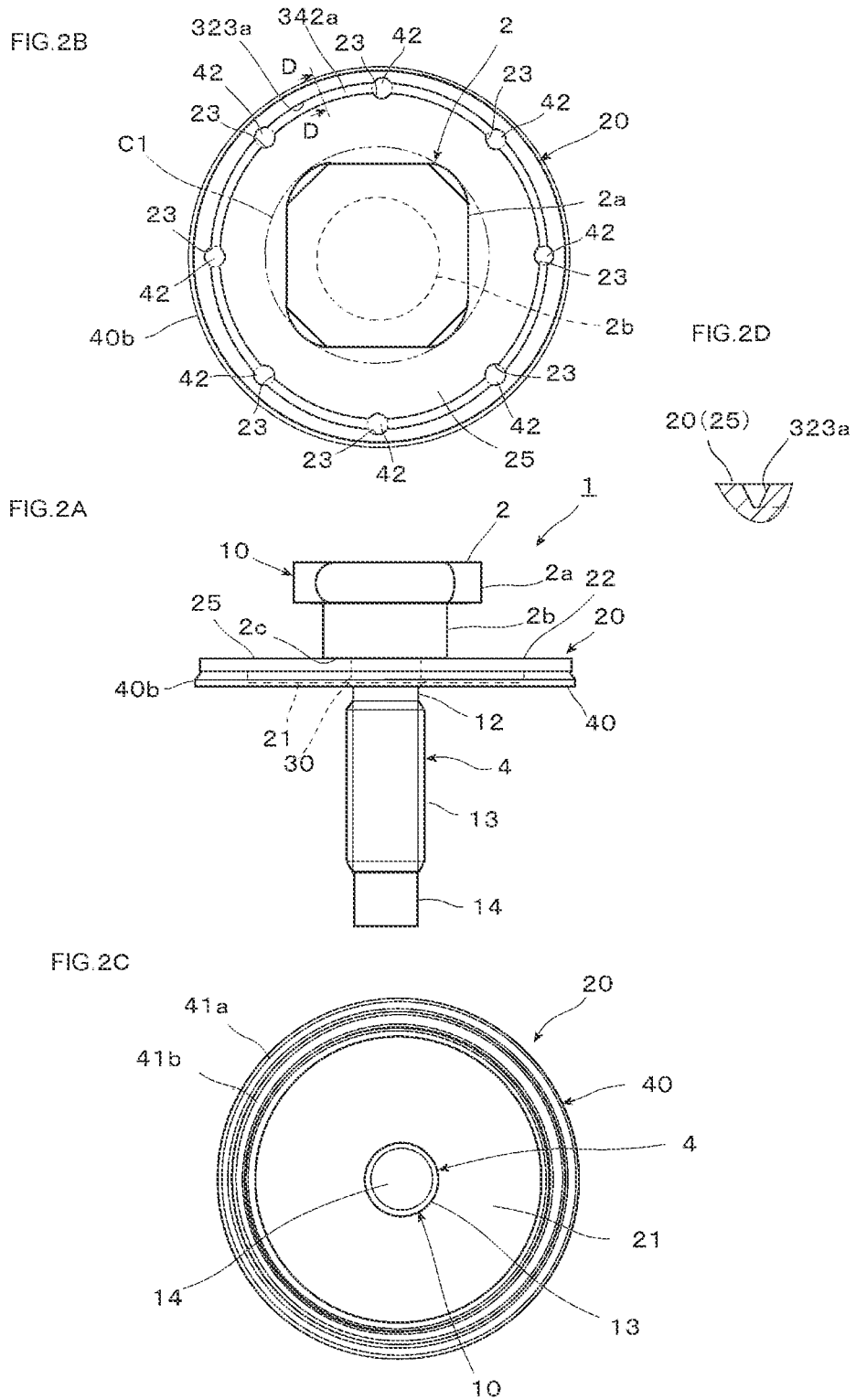

THREADED FASTENER

CROSS-REFERENCE TO RELATED APPLICATIONS

This application claims the benefit and priority of Japanese Patent Application Number 2020-063022, filed Mar. 31, 2020. The entire disclosure of the above application is incorporated herein by reference.

BACKGROUND

Technical Field

The present disclosure relates to a threaded fastener, and more particularly to a threaded fastener having a water stop or sealing function.

Background Art

As a conventional threaded fastener of this type, for example, there has been known a threaded fastener as described in Patent Literature 1. That is, the threaded fastener includes a fixing bolt that has a head portion with which a resin molded article (part) is engaged and a shank portion on which a thread is formed, and a seal washer into which the shank portion of the fixing bolt is inserted so that the seal washer comes into surface contact with the head portion of the fixing bolt and a vehicle panel (a member to be fastened or a fastened member) directly or through a washer. The seal washer includes a first seal portion that is formed on an outer peripheral side of a washer main body and is brought into pressure contact with the vehicle panel, and a second seal portion that is formed on an inner peripheral side of the washer main body and is brought into pressure contact with at least one of a lower surface of the head portion and an outer peripheral surface of the shank portion. The washer main body has a bearing surface in contact with the vehicle panel, and a recessed portion formed so as to surround the bearing surface, and the first seal portion is fixed to the recessed portion, wherein when the bolt is fastened to the vehicle panel, the first seal portion comes into contact with the vehicle panel with an appropriate contact pressure in a state in which the bearing surface of the washer main body is in contact with the vehicle panel thereby to provide a sufficient axial force, so that the entry of water from the outer peripheral side of the washer main body is stopped.

CITATION LIST

Patent Literature

Patent Literature 1: Japanese Patent Application Laid-Open Publication No. 2013-2621

SUMMARY

Technical Problem

However, the seal washer disclosed in Patent Literature 1 has a complicated shape in which rubber materials of the first seal portion and the second seal portion are connected with each other via a through hole formed in the washer main body, and has poor moldability, as a result of which it is expected that productivity will worsen and costs will rise.

In addition, when the resin molded article is assembled to a vehicle, the seal washer is fitted over the bolt after the bolt is attached to the resin molded article, and hence, assembling workability is poor. Therefore, it is considered that the seal washer is attached to the bolt in advance to form an assembly. In this case, however, a process for forming the assembly is required, resulting in an increase in cost. Also, even if the seal washer is formed as an assembly, there is a fear or possibility that the seal washer may be detached during transportation.

Moreover, in cases where the second seal portion of the seal washer is configured to be pressed against the outer peripheral surface of the shank portion at the head side of the bolt and has a diameter smaller than the diameter of the shank portion, when the seal washer is mounted on the bolt, the bolt needs to be inserted into and through the seal washer from the distal end side of the shank portion to the head side thereof in a state where the second seal portion is expanded in diameter, during which it is necessary for the seal washer to get over the thread with a larger diameter than that of the shank portion, which takes time and is poor in workability.

Further, since the seal washer is separate from the bolt and is provided with the first and second seal portions, it is necessary to tighten the seal washer until two contact surfaces, i.e., a contact surface of the seal washer with the bolt head and another contact surface of the seal washer with the mating part, come into metal surface contact with the bolt head and the mating part. Therefore, the consumption of axial force increases, and it is difficult to use a low axial force region.

An object of the present disclosure is to provide a threaded fastener that has a configuration with good productivity and good assembling workability, can be used even in a low axial force region, and also has a water stop function on inner and outer peripheries of a washer.

Solution to Problem

In order to achieve the above object, a threaded fastener according to the present disclosure comprises: a bolt having a head portion and a shank portion with a thread formed thereon; a washer fitted over the shank portion to come into contact with the head portion; and a seal member fixed to an outer peripheral side of the washer. The washer has a bearing surface in contact with a fastened member and a recessed portion formed to surround the bearing surface, and the seal member is fixed to the recessed portion, so that the seal member is in contact with the fastened member in a water stop state, with the bearing surface held in contact with the fastened member.

The shank portion is provided with a caulking portion that is caulked and fixed to an entire opening portion peripheral edge of an inner periphery of the washer in a water stop state.

The seal member is provided on its outer periphery with a protrusion portion that protrudes outward beyond a radially outer end of an adhesive portion of the seal member adhered to the recessed portion of the washer in a no-load state. This protrusion portion has a back surface at the opposite side of the fastened member, the back surface being an inclined surface that inclines in a direction to gradually increase in diameter toward a thread distal end.

According to the present disclosure, the stop or prevention of water at the inner peripheral side of the washer is performed by the caulking portion provided on the shank portion, and a seal portion made of an elastic material is only required on the outer peripheral side of the washer, and hence, moldability is improved.

In addition, since the washer is integrated with the bolt by means of the caulking portion, the work of inserting the shank portion of the bolt into the washer is unnecessary, and the assembly work at the time of fastening is also simple.

Moreover, since the load required until the bearing surface of the washer main body comes into contact with the fastened member is only to compress the seal portion at the outer peripheral side thereof, it is possible to use a low axial force region.

Further, even if the threaded fastener is submerged, the water pressure applied to the protrusion portion acts on the protrusion portion, so that the contact surface pressure of the seal member can be increased.

In particular, even if fatigue or wearing of the seal member has occurred due to the aged deterioration of the elastic material and the contact surface pressure of the seal member has been decreased, the water stop performance of the seal member can be maintained by means of the protrusion portion that generates the contact surface pressure due to the water pressure. In addition, since the protrusion portion is not configured to bulge outward in a fastened state but to protrude in a no-load state, the protruding shape of the protrusion portion will be maintained even if fatigue or wearing of the seal member occurs.

Moreover, in another aspect of the present disclosure, the seal member is provided with a plurality of annular convex portions in a concentric manner, and the heights of these annular convex portions decrease in a stepwise manner from a radially outer end side toward a radially inner end side of the seal member.

The seal member can be reliably compressed from the radially outer end side of the seal member, through which water intrudes, so that the contact surface pressure of the seal member can be increased. In addition, since the contact area of the seal member with the fastened member is reduced by the annular convex portions, the compressive load applied to the seal member can be reduced, thus making it possible to suppress the consumption of axial force.

Moreover, the seal member may be provided at its radially inner end portion with an underfill portion.

When the threaded fastener is fastened to the fastened member, the radially inner end portion of the seal member may protrude toward the bearing surface of the washer main body, so that a protruding portion of the seal member thus formed may be caught or bitten between the bearing surface and the fastened member, resulting in a reduction in the axial force and a reduction in the water stop performance. However, with the provision of the underfill portion formed in the radially inner end portion of the seal member, it is possible to prevent the radially inner end portion of the seal member from protruding toward the bearing surface side of the washer, thus making it possible to prevent the reduction in the axial force as well as the reduction in the water stop performance due to the biting.

In addition, the seal member is constructed to have a fitting portion fitted into a fixing hole formed in the washer main body.

With this construction, the seal member is held by the fitting portion, so that it is possible to prevent the seal member from being separated or slipped off from the washer, even in cases where the outer peripheral portion of the seal member interferes with other components or the like during storage, transportation, work, or the like.

Also, the fixing hole and the fitting portion may be provided with slip-off preventing portions, respectively, which engage with each other in a direction in which the fitting portion slips off from the fixing hole.

When the slip-off preventing portions are provided in this manner, a separation or slip-off preventing effect can be exhibited.

Moreover, it is preferable that the fitting portion have its distal end located inside the fixing hole, or flush with a head side end surface of the washer. In this way, during the fitting work, the fitting portion can be smoothly attached to a mounting portion of the fastened member without fear or possibility of the fitting portion interfering with the mounting portion.

Further, in still another aspect of the present disclosure, the seal member is adhered and fixed to the recessed portion in the washer.

In this way, the structure of the seal member and the washer can be simplified.

Also, in the case of adhering and fixing the seal member, the underfill portion can be formed in the radially inner end portion of the seal member.

In addition, a gap may be provided between the inner periphery of the seal member and the outer periphery of the bearing surface of the washer.

With the provision of the gap, it is possible to prevent the biting of the radially inner end portion of the seal member without forming the underfill portion.

The seal member may be a water repellent member.

In the case where the seal member has water repellency, even if fatigue or wearing occurs in the seal member, the water stop or prevention performance can be maintained if the fastened member also has water repellency.

Advantageous Effects of the Disclosure

As described above, according to the present disclosure, it is possible to achieve a threaded fastener which has a configuration with good productivity and good assembling workability, can be used even in a low axial force region, and has a water stop function on the inner and outer peripheries of a washer.

DRAWINGS

FIGS. 1A through 1D illustrate a threaded fastener according to a first embodiment of the present disclosure, wherein FIG. 1A is a cross-sectional view of the threaded fastener, FIG. 1B is an enlarged cross-sectional view of a seal portion, FIG. 1C is an enlarged cross-sectional view of a caulking portion, and FIG. 1D is a partial cross-sectional view illustrating another form of an underfill portion of the seal portion;

FIG. 2A is a front view of the threaded fastener in FIG. 1A, FIG. 2B is a plan view of the threaded fastener, FIG. 2C is a bottom view of the threaded fastener, and FIG. 2D is an enlarged cross-sectional view taken along line D-D of FIG. 2B;

Figure 7C:
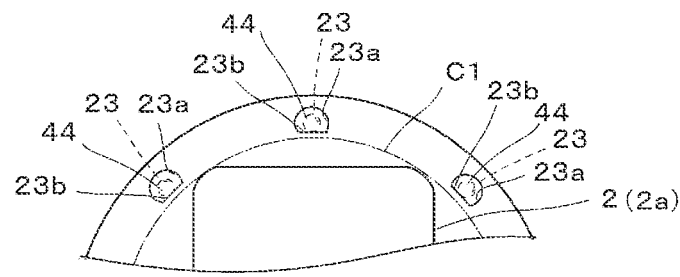
Figure 7D:
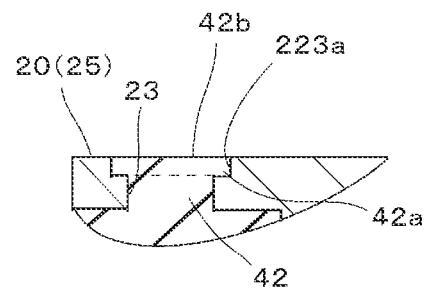
Figure 7A:
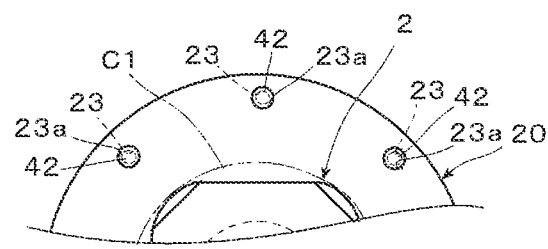
Figure 7B:
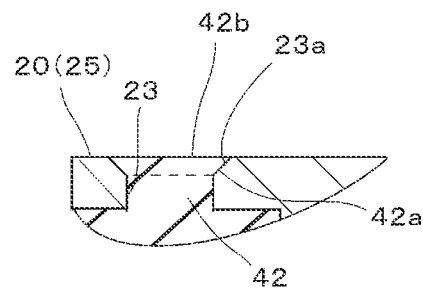
Figure 8:
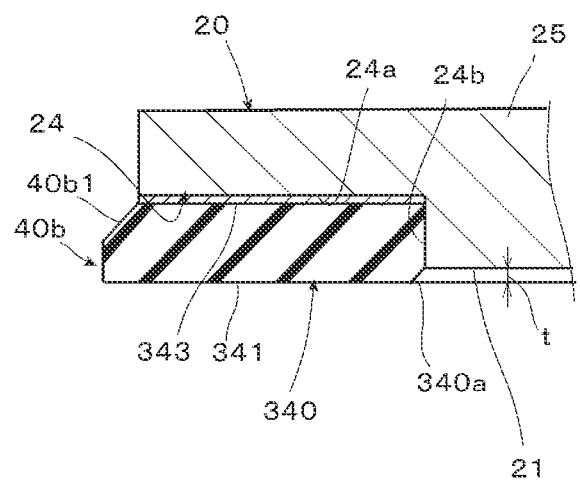

FIGS. 7A through 7D illustrate an example of another structure of slip-off preventing portions for a seal member according to a second modification, wherein FIG. 7A is a partial plan view of the slip-off preventing portions, FIG. 7B is a partial cross-sectional view of the slip-off preventing portions, FIG. 7C is a partial plan view of another form of the slip-off preventing portions, and FIG. 7D is a partial plan view of a threaded fastener in which the slip-off preventing portions are formed into a counterbored shape; and FIG. 8 is a view illustrating an example of a structure of a seal member according to a third modification.

DETAILED DESCRIPTION

Hereinafter, the present disclosure will be described in detail based on embodiments illustrated in the accompanying drawings.

The dimensions, materials, shapes, relative positions, and the like of component parts described in the embodiments should be appropriately changed depending on the structure and various conditions of each apparatus to which the disclosure is applied, and the scope of the disclosure is not intended to be limited to the following embodiments.

First, an overall structure of a threaded fastener according to an embodiment of the present disclosure will be described with reference to FIGS. 1A and 2A through 2C. FIG. 1A is a partial cross-sectional front view illustrating a washer portion in cross section of the threaded fastener according to the present embodiment, and FIGS. 2A through 2C are views illustrating the external appearance of the threaded fastener. In the following description, description will be made mainly with reference to FIG. 1A and, if necessary, with reference to FIGS. 2A through 2D.

This threaded fastener 1 is composed of a bolt 10 having a head portion 2 and a shank portion 4 with a threaded portion 13 formed thereon, and a washer 20 with a seal member 40 fitted on the shank portion 4, wherein the bolt 10 and the washer 20 are caulked and fixed to each other to form an integrally assembled structure.

The head portion 2 includes a large diameter portion 2a of a quadrangular shape such as a rectangular shape at its top side and a small diameter portion 2b of a cylindrical shape at its shank portion 4 side (see FIGS. 2A and 2B), wherein the small diameter portion 2b is smaller than a distance between two opposing sides of the large diameter portion 2a. The small diameter portion 2b has its end surface at the side of the shank portion 4 that constitutes a head bearing surface 2c, and the washer 20 with the shank portion 4 inserted therein is in contact with the head bearing surface 2c.

The shank portion 4 is constructed to include, from its head portion 2 side toward its thread distal end side, a fitting shank portion 11 on which the washer 20 is mounted, a threadless under-neck portion 12, a threaded portion 13 formed with a thread, and a threadless small diameter guide portion 14 extending further from a distal end of the threaded portion 13 toward the thread distal end side. The diameter of the fitting shank portion 11 is a diameter before thread forming, the diameter of the under-neck portion 12 is equal to or greater than a root diameter of the threaded portion 13, and the guide portion 14 has a diameter according to required dimensions.

The shank portion 4 is formed, in a boundary portion between the under-neck portion 12 and the fitting shank portion 11, with an annular caulking portion 30 which is in contact with an entire peripheral edge 22 of an opening portion of the washer 20 in a water stop state, and the washer 20 is fixed between the caulking portion 30 and the head bearing surface 2c so as not to move in the axial direction.

FIG. 1C illustrates on an enlarged scale the caulking portion 30.

The caulking portion 30 is constructed such that the boundary portion between the under-neck portion 12 and the fitting shank portion 11 protrudes outward in a direction orthogonal to a central axis N in a chevron shape in cross section, and a protruding distal end portion 30a at a radially outer side of the caulking portion 30 annularly covers a metal bearing surface 21 of the washer 20.

On the other hand, a surface of the caulking portion 30 in contact with the opening portion peripheral edge 22 of the washer 20 is an inclined surface 31 that gradually inclines or slopes toward the head portion 2 side from the distal end portion 30a, which is the largest diameter of the caulking portion 30, toward the center side in the radial direction. The shape of the opening portion peripheral edge 22 of the washer 20 is also an inclined surface following the inclined surface 31 of the caulking portion 30. The inclined surface 31 of the caulking portion 30 and the opening portion peripheral edge 22 are not necessarily a conical surface shape as illustrated, but can take various shapes depending on the force applied between the contacting surfaces and the plastic deformation of each member during the caulking process. However, basically, the inclined surface 31 and the opening portion peripheral edge 22 bite into each other in a wedge shape and contact with each other in a water stop state.

The threaded portion 13 in this embodiment is formed by rolling, and the caulking portion 30 is also formed during rolling. That is, during the rolling of the under-neck portion 12, a raw material part 15 indicated by a one dot chain line in FIG. 1C is compressed inward in the radial direction to deform a part of metal material to form the caulking portion 30, wherein a corner portion of the opening portion peripheral edge 22 is crushed, so that the inclined surface 31 of the caulking portion 30 bites in a wedge shape, and the distal end portion 30a at the radially outer side of the caulking portion 30 is annularly attached to the opening portion peripheral edge 22 of the bearing surface 21 of the washer 20. The caulking portion 30 corresponds to a neck lower portion 32 that is located at a base between the under-neck portion 12 and the bearing surface 21 of the washer 20. The neck lower portion 32 has a tapered shape, a composite R shape, or the like.

Now, the washer 20 will be described with reference to FIGS. 1A and 1B.

The washer 20 is made of metal, and is provided with an annular seal member 40 having elasticity, which is disposed so as to surround an entire circumference of the bearing surface 21 of the washer 20. The washer 20 is provided with an annular concave or recessed portion 24 in which the seal member 40 is mounted.

The recessed portion 24 includes a bottom surface 24a parallel to the bearing surface 21, and a step portion 24b between the bottom surface 24a and the bearing surface 21, wherein an end surface of the seal member 40 is mounted in close contact with the bottom surface 24a, and an inner peripheral surface of the seal member 40 is mounted in contact with the step portion 24b. The annular seal member 40 is compressed and deformed by contact pressure with a member to be fastened (hereinafter, also referred to as a fastened member) at the time of fastening, which will be described later, and the bearing surface 21 of the washer 20 surrounded by the seal member 40 is seated on the member to be fastened, whereby an axial force can be reliably ensured.

Also, since the seal member 40 is mounted in the recessed portion 24 formed in the outer end portion 26 of the washer 20, the area of the bearing surface 21 of the washer 20 can be made large, and even in cases where the diameter of a hole in the member to be fastened is irregular, circular, or larger than a general hole diameter, it is possible to easily design the seal member 40 in order to secure an appropriate axial force receiving area.

Next, the seal member 40 will be described in detail mainly with reference to FIG. 1B and partially with complementary reference to FIG. 2C.

As illustrated in FIGS. 1B and 2C, the seal member 40 is provided with a plurality of (e.g., two in this embodiment) annular convex portions 41a to 41b in a concentric manner. In the following description, a first annular convex portion 41a and a second annular convex portion 41b are distinguished from each other in the direction from the radially outer side to the radially inner side. Here, note that the number of the annular convex portions is described, for example, as two, but is not limited thereto, and may be one, three or more.

Both the first and second annular convex portions 41a, 41b have their protruding ends protruding to the distal end side of the shank portion 4 by predetermined heights above the bearing surface 21 with reference to the bearing surface 21 of the washer 20. The height of protrusion is the highest at the height t1 of the first annular convex portion 41a positioned at the outermost side, and decreases stepwise to the height t2 of the second annular convex portion 41b in this order. In the drawings, each protrusion height is illustrated in an exaggerated manner.

The height of protrusion is such that a line L connecting the top of the first annular convex portion 41a and the top of the second annular convex portion 41b is placed on a straight line, and an angle θ of this line L with respect to an axial perpendicular direction (i.e., a direction perpendicular to the axis of the shank portion 4) is set to approximately 0 to 3 degrees. Here, the angle of 0 to 3 degrees is a guideline, but may be 3 degrees or more. The angle θ is determined by the protrusion heights t1, t2 of the first and second annular convex portions 41a, 41b and the distance (pitch) in the radial direction between the tops thereof, wherein the angle θ increases as the distance between the tops decreases, and decreases as the distance between the tops increases. Specifically, it is assumed that the distance in the radial direction is about 0.5 to 3 mm, and the protrusion height is about 0.2 mm. The numerical values of the distance in the radial direction and the protrusion height are merely examples, and are not limited to these numerical values. The protrusion height is determined by the material, elastic characteristics, surface state, wettability, and the like of the seal member 40, and the angle θ is set from the distance in the radial direction and the protrusion height.

Also, an annular first valley bottom portion 43a is formed between the first annular convex portion 41b and the second annular convex portion 43a, and the first valley bottom portion 43a is located at a position recessed by a predetermined amount from the bearing surface 21 of the washer 20.

An underfill portion 40a is formed at a radially inner end portion of the seal member 40 adjacent to the bearing surface 21. The underfill portion 40a has an annular groove shape recessed from the bearing surface 21 of the washer 20, and includes an annular groove bottom portion 40a1 lower than the bearing surface 21, an inner peripheral side inclined surface 40a2, and an outer peripheral side inclined surface 40a3. The inner peripheral side inclined surface 40a2 extends from the groove bottom portion 40a1 to a radially outer end 21a of the bearing surface 21 while being inclined so as to be gradually displaced inward toward the distal end side of the shank portion 4, and the outer peripheral side inclined surface 40a3 extends to the top of the second annular convex portion 41b while being inclined so as to be gradually opened outward toward the distal end of the shank portion 4.

The underfill portion 40a is not limited to the groove shape as described above, and may be formed by, for example, a chamfered portion 40a5 in which a corner portion of the seal member 40 is cut out in a straight line shape (conical surface shape), as illustrated in FIG. 1D. The chamfered portion 40a5 has a radially inner end that is positioned at the same height as the bearing surface 21 of the washer 20, but may be lower than the bearing surface 21. These configurations of the underfill portion 40a are merely examples and are not limited to these shapes, but a variety of shapes can be selected which are obtained by cutting out a part of the radially inner end portion of the seal member 40 over a predetermined width.

On the other hand, the seal member 40 is formed on its entire outer periphery with a protrusion portion 40b that protrudes outward so as to have a diameter larger than that of the radially outer end of the washer 20 in a no-load state. The protrusion portion 40b is a portion protruding outward from a radially outer end 40b2 of an adhesive portion 40b3 of the seal member 40 adhered to the recessed portion 24 of the washer 20. In this embodiment, a part of the first annular convex portion 41a protrudes outward, and the top portion 41a1 of the first annular convex portion 41a has a wide configuration extending from the inner side to the outer side across an outer diameter line M of the washer 20. In addition, the protrusion portion 40b has a back surface 40b1 at the opposite side of its top portion, the back surface being an inclined surface that inclines in a direction to gradually increase in diameter toward a thread distal end (i.e., the distal end of the threaded shank portion 13). Here, note that the inclined shape of the back surface 40b1 is not limited to the linear shape as illustrated, and may be formed to incline in a curved manner.

In the illustrated embodiment, the maximum diameter of the protrusion portion 40b is larger than the outer diameter of the washer 20, but may be smaller than the outer diameter of the washer 20.

The seal member 40 is integrally molded with the washer 20 by injection molding, and the recessed portion 24 of the washer 20 is provided in the circumferential direction with a plurality of fixing holes 23 that extend through the recessed portion 24 in the axial direction. The seal member 40 is formed on its back surface with seal material inflow portions (fitting portions) 42 that are fitted into the fixing holes 23. The seal material inflow portions (fitting portions) 42 each have a cylindrical shape extending linearly in the axial direction, and are fitted into the fixing holes 23, respectively.

As illustrated in FIGS. 2B and 2D, the washer 20 is provided on its head side end surface 25 with an annular groove 323a, through which the fixing holes 23 are connected with one another and which acts as a structure for preventing the seal material inflow portions 42 from slipping off, so that a runner portion 342a, which has flown into the annular groove 323a and has been solidified, and the annular groove 323a together constitute slip-off preventing portions. The runner portion 342a has a minimum groove width diameter located outside a maximum diameter portion of the head portion 2, i.e., outside a circumscribed circle C1 that passes through corners of the large diameter portion 2a in the illustrated example. In this way, the runner portion 342a can be sealed by a mold surface of a mold while avoiding the head portion 2, which makes molding easier.

Thus, the seal member 40 is held by the runner portion 342a, and even in cases where the outer peripheral portion of the seal member 40 interferes with other components or the like during storage, transportation, work, or the like, it is possible to prevent the seal member 40 from being separated or slipped off from the washer 20.

Here, note that the exposed surfaces of the seal material inflow portions 42 and the runner portion 342a exposed to the head side end surface 25 of the washer 20 are flush with the head side end surface 25. It is preferable that the seal material inflow portions 42 and the runner portion 342a do not protrude from the head side end surface 25 of the washer 20, in other words, they be flush with the head side end surface 25 or recessed concavely from (or lower than) the head side end surface 25.

Also, note that the seal member 40 does not need to be injection molded, but may be molded separately and assembled later.

Various resins and various rubber materials can be used as the material of the seal member 40, but if the seal member 40 has water repellency, a water stop effect is further improved.

As for the water repellency of the seal member 40, for example, if a water repellent material (according to JISR3257 "Testing method of wettability of glass substrate") with a contact angle of 90 degrees or more, more preferably 100 degrees or more, is used, the contact surface pressure of the seal member 40 will decrease due to aging, and in addition, the repulsive force thereof will become zero, and the water repellency thereof will provide a water stop function. In particular, it is preferable that the surface of a mating member to be contacted be subjected to a water repellent treatment.

Next, the fastening work using the threaded fastener of the present embodiment will be described with reference to FIG. 3.

Figure 3A:
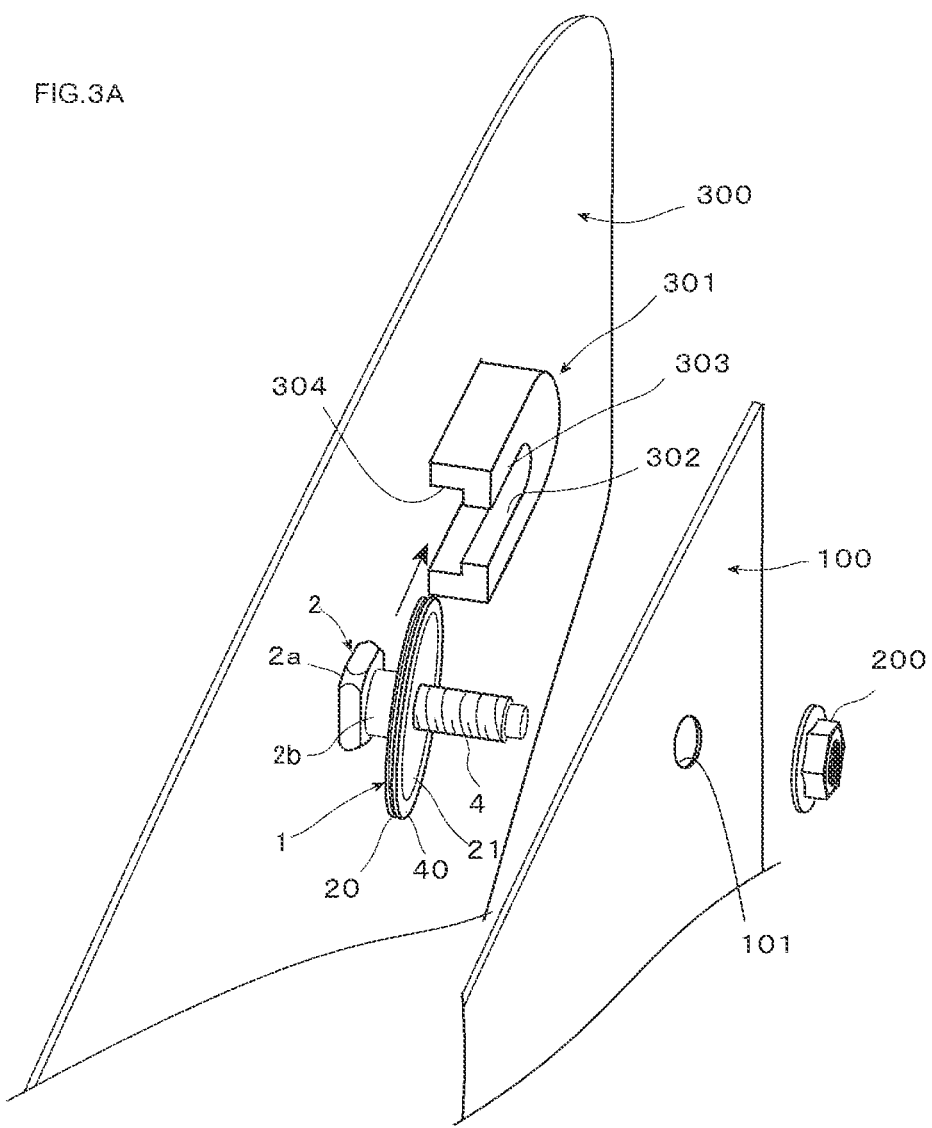
FIG. 3A is a perspective view illustrating a relation between the threaded fastener, a bolt mounting portion of a mounting plate, a vehicle body panel, and a nut.

As illustrated in FIG. 3A, the head portion 2 of the threaded fastener 1 is held by a bolt mounting portion 301 of a mounting plate 300 such as, for example, a resin panel, which is an interior part or an exterior part of a vehicle body, and the shank portion 4 is maintained in a state of protruding at right angles to the mounting plate 300.

The bolt mounting portion 301 includes a rectangular holding plate 303 disposed in parallel with the mounting plate 300 at a predetermined interval, and a support wall 304 supporting three sides of the holding plate 303 to the mounting plate 300, and has a flat box shape in which one side of the holding plate 303 is opened. The holding plate 303 is provided with a groove 302 linearly extending from its open end side to substantially the center of the holding plate 303. The interval between the mounting plate 300 and the holding plate 303 is slightly larger than the thickness of the large diameter portion 2a of the head portion 2, and the groove 302 has a width through which the small diameter portion 2b of the head portion 2 can be inserted.

Figure 3B:
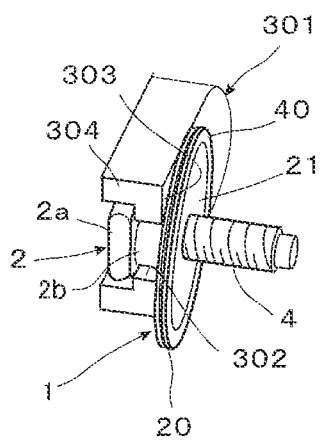
FIG. 3B is a perspective view illustrating a state in which the threaded fastener is mounted on the bolt mounting portion.

In the mounting work of the threaded fastener 1, the top surface of the large diameter portion 2a of the head portion 2 is caused to slide along the mounting plate 300, so that the small diameter portion 2b is inserted into the groove 302 of the holding plate 303, and the threaded fastener 1 is mounted to the mounting plate 300, as illustrated in FIG. 3B.

Figure 4:
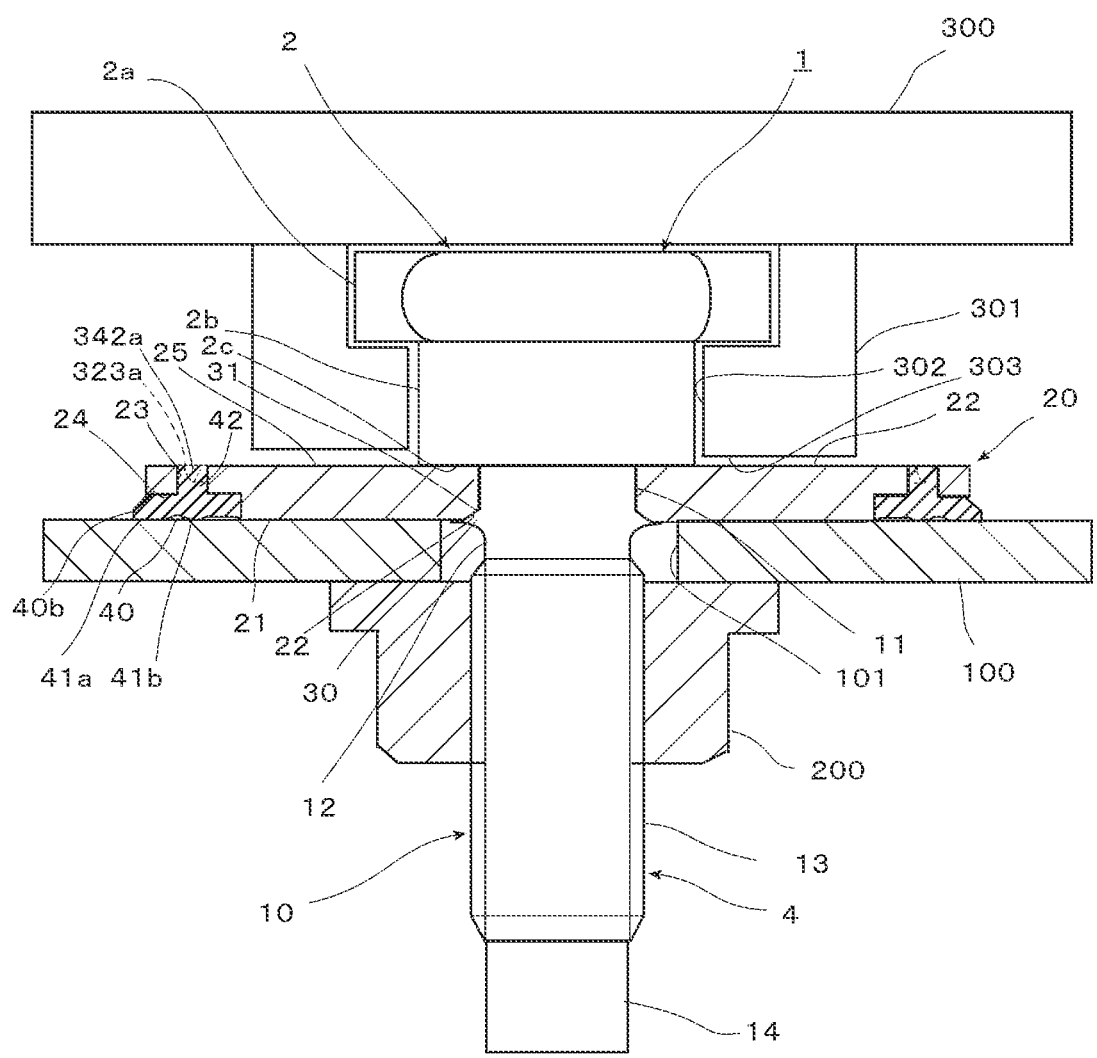
FIG. 4 is a cross-sectional view of a fastened state of the threaded fastener.

In this mounting work, as illustrated in FIG. 4, the exposed surfaces of the seal material inflow portions 42 and the runner portion 342a are flush with the head side end surface 25 of the washer 20 in which the fixing holes 23 open, and hence, there is no possibility that the seal material inflow portions 42 will interfere with the holding plate 303 of the bolt mounting portion 301, so that the threaded fastener 1 can be mounted to the mounting plate 300 in a smooth manner. In addition, if the seal material inflow portions 42 and the runner portion 342a protrude from the head side end surface 25 of the washer 20, they may interfere with the holding plate 303 of the bolt mounting portion 301, depending on the size thereof, which may hinder the mounting of the threaded fastener 1.

On the other hand, with respect to the shank portion 4, the shank portion 4 is inserted into a shank hole 101 of a vehicle body panel 100 which is the member to be fastened, and a nut 200 is fastened and fixed to the shank portion 4 protruding to the inside of the vehicle body panel 100. FIG. 4 illustrates a state in which the shank portion 4 is fastened and fixed to the vehicle body panel 100. At the time of fastening, first, the seal member 40 comes into contact with the vehicle body panel 100, and the seal member 40 is compressed in the axial direction as a fastening force increases, so that the bearing surface 21 of the metal washer 20 is seated on the vehicle body panel 100. By further fastening, a required axial force is exerted by the metal contact between the bearing surface 21 of the washer 20 and the vehicle body panel 100, so that an appropriate axial force is maintained over a long period of time.

In addition, as described above, since the washer 20 is integrally fixed to the bolt 10 by the caulking portion 30 to form the single threaded fastener 1, the number of components required can be reduced and the weight of the threaded fastener 1 can be reduced. Also, the fastening work can be performed only by fastening the single threaded fastener 1, so that the workability is remarkably improved.

In particular, the cross-sectional shape of the seal member 40 cut in a plane including the central axis of the shank portion 4 is a quadrangular shape with chamfered corners, and the underfill portion 40a is formed in the inner peripheral side corner portion, and hence, there is no fear or possibility that the compressed seal member 40 will protrude to the bearing surface 21 side to bite therein, and it is possible to prevent a decrease in the axial force and a decrease in the water stop performance.

This "protrusion" will be described with reference to FIG. 5.

Figure 5A:
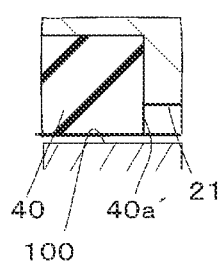
FIGS. 5A and 5B are explanatory views of a protruding state when there is no underfill portion at a radially inner end portion of a seal member.
Figure 5B:
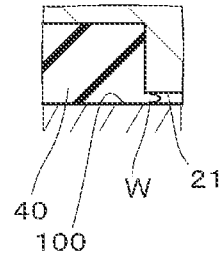

FIG. 5A virtually illustrates, as a comparative example, a case where there is no underfill portion 40a in the radially inner end portion 40a' of the seal member 40. In this case, as illustrated in FIG. 5B, when the seal member 40 is compressed between the bearing surface 21 of the washer 20 and the fastened member, the radially inner end portion 40a' of the seal member 40 protrudes toward the bearing surface 21 of the washer 20, and a protruding portion W of the seal member 40 may be caught or bitten between the bearing surface 21 of the washer 20 and the fastened member.

Figure 5C:
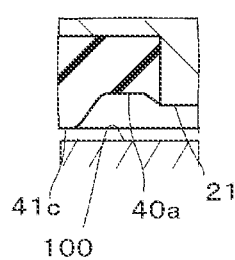
FIGS. 5C and 5D are explanatory views in cases where an underfill portion of the present disclosure is provided.
Figure 5D:
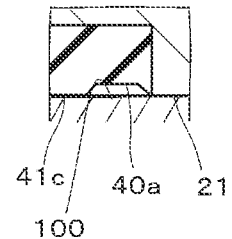

On the other hand, in cases where the underfill portion 40a is provided in the radially inner end portion of the seal member 40, as in the present embodiment, the seal member 40, even if compressed, will not protrude to the bearing surface 21 side, as illustrated in FIGS. 5C and 5D.

Water Stop Function

Next, the water stop function will be described with reference to FIG. 4.

As illustrated in FIG. 4, the head portion 2 side is exposed to an external space, and there are two water intrusion routes including a first route and a second route. The first route is formed at the inner peripheral side of the washer 20, i.e., extending from a gap between the contact surfaces of the head bearing surface 2c and the head side end surface 25 of the washer 20 to the shank hole 101 side of the vehicle body panel 100 through a gap between the inner periphery of the washer 20 and the fitting surface of the fitting shank portion 11 of the bolt 10 and a gap between the inner periphery of the washer 20 and the fitting surface of the under-neck portion 12 of the bolt 10. The second route is formed at the outer peripheral side of the washer 20, i.e., extending from a gap between the contact surfaces of the bearing surface 21 of the washer 20 and the vehicle body panel 100 to the shank hole 101 of the vehicle body panel 100.

In the first route, water is stopped by the caulking portion 30 that is in close contact with the opening portion peripheral edge 22 of the washer 20. In particular, since the inclined surface 31 of the caulking portion 30 bites into the opening portion peripheral edge 22 of the inner periphery of the washer 20 in a wedge shape thereby to keep its contact pressure high, the excellent sealing performance is maintained.

On the other hand, the second route is sealed by the seal member 40 provided on the outer periphery of the washer 20.

Sealing Action of the First and Second Annular Convex Portions 41a, 41b

The seal member 40 can be reliably compressed from the radially outer end side of the seal member 40, which is a water entry portion, so that the contact surface pressure thereof can be increased. In addition, the contact area of the seal member 40 with the fastened member is reduced by the first and second annular convex portions 41a, 41b, so that a compressive load on the seal member 40 can be reduced, and the consumption of the axial force can be suppressed. In addition, since the protrusion portion 40b is formed that extends to a larger diameter than the radially outer end of the washer 20, the contact area of the first annular convex portion 41a with the fastened member is extended to a wider area than that of the washer 20, and as a whole, the sealing performance can be increased while suppressing the consumption of the axial force.

Moreover, even if the seal member 40 has been fatigued or worn, the water stopping performance can be maintained as long as the seal member 40 is made of a material having water repellency as described above.

Further, the seal member 40 is provided on its outer periphery with the protrusion portion 40b that extends more outward than the radially outer end of its contact portion with the washer 20 in the no-load state, and hence, even if the seal member 40 is submerged, water pressure acts on the protrusion portion 40b to ensure the contact surface pressure of the seal member 40, in this embodiment, the sealing surface pressure of the first annular convex portion 41a, thus increasing the water stop effect. The water pressure acts on the back surface 40b1 of the protrusion portion 40b on the opposite side of the top portion thereof, and pushes the protrusion portion 40b toward the fastened member, thereby producing the effect of increasing the sealing surface pressure of the first annular convex portion 41a. In particular, by forming the back surface 40b1 as an inclined surface, the area to receive the water pressure is increased, and the contact surface pressure can be increased.

In the following, various modifications of the seal member will be described. In the following description, only differences from the above-mentioned embodiment will be mainly described, and the same components will be denoted by the same reference numerals and the description thereof will be omitted.

First Modification

Figure 6:
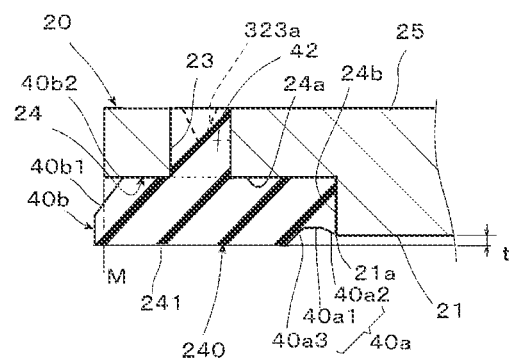
FIG. 6 is a view illustrating an example of a structure of a seal member according to a first modification.

FIG. 6 illustrates a first modification.

A seal member 240 of this first modification is constructed such that a surface of the seal member 240 at its fastened member side is a flat seal surface 241, without providing annular convex portions. In this case, too, a protrusion portion 40b can be provided at the radially outer side of the seal member 240, and an underfill portion 40a can be provided at the radially inner side of the seal member 240.

A seal surface 241 protrudes toward a distal end side of a shank portion 4 by a predetermined height t from a bearing surface 21 of a washer 20, with reference to the bearing surface 21.

In the seal member 240 of this first modification, the load required until the bearing surface 21 of the washer 20 comes into contact with a fastened member is higher than that in the above-mentioned first embodiment, but a seal member 40 is only compressed, and hence, a low axial force region can be used as in the above-mentioned first embodiment.

Here, note that the seal surface 241 is a flat surface orthogonal to the center line of a threaded shank portion, but, as indicated by a two dot chain line, the seal surface 241 may be formed to have an inclination angle inclined downward (toward a distal end side of the shank portion) from its radially inner end side to its radially outer end.

Second Modification

FIG. 7 illustrates a second modification.

This second modification is a modification of the slip-off preventing portions for the seal member 40.

FIGS. 7A and 7B illustrate an example of a structure in which a chamfered portion 23a is formed on an opening edge at the back surface side (head side) of each fixing hole 23. A bulged portion 42a protruding to a large diameter is provided at a distal end portion of each seal material inflow portion 42, and the bulged portion 42a is in engagement with the chamfered portion 23a so as to prevent the seal material inflow portion 42 from slipping off. The chamfered portion 23a is constructed such that an opening corner portion of each fixing hole 23 is cut in a conical surface shape, and a contact surface of the bulged portion 42a with the chamfered portion 23a is formed to increase in diameter in an inverted conical surface shape toward the head side corresponding to the chamfered portion 23a. In this second modification, a bulged portion 42a and a chamfered portion 23a together constitute slip-off preventing portions that engage with each other in a direction in which a seal material inflow portion 42 slip off from a fixing hole 23.

Since the seal member 40 is held by the bulged portions 42a in this manner, it is possible to prevent the seal member 40 from being separated or slipped off from the washer 20 even when the outer peripheral portion of the seal member 40 interferes with other components or the like during storage, transportation, work, or the like.

Here, preferably, an exposed surface 42b of each seal material inflow portion 42, which is exposed on the head side end surface 25 of the washer 20, does not protrude from the head side end surface 25 of the washer 20, in other words, it is flush with the head side end surface 25 or is recessed concavely from (or lower than) the head side end surface 25.

As illustrated in FIG. 7A, the chamfered portion 23*a* of each fixing hole 23 is also located outside a maximum diameter portion of the head portion 2, that is, a circumscribed circle C1 passing through corners of the large diameter portion 2*a* of the head portion 2 in the illustrated example, so that the chamfered portion 23*a* can be sealed or tightly closed by a mold surface of a mold while avoiding the head portion 2, thereby facilitating molding. In addition, in cases where the diameter of the head portion 2 is so large that the circumscribed circle C1 is close to the chamfered portions 23*a*, as illustrated in FIG. 7C, the shape of each chamfered portion 23*a* may be a major arc shape having a cut portion 23*b* formed by partially cutting an outer peripheral circle of the chamfered portion 23*a*.

Here, note that the shapes of the slip-off preventing portions are not limited to the conical-shapes of the bulged portions 42*a* and the chamfered portions 23*a* as described above, but the slip-off preventing portions may be, for example, stepped cylindrical bulged portions 42*a* and stepped cylindrical counterbored portions 223*a*, as illustrated in FIG. 7D. That is, the bulged portions 42*a* engage the counterbored portions 223*a* to attain to prevent the seal material inflow portions 42 from slipping off.

Third Modification

FIG. 8 illustrates a third modification.

In this third modification, a seal member 340 takes a simple flat washer shape, and has an inner peripheral surface 344 extending linearly in a direction orthogonal to a bearing surface 21, and the seal member 340 is provided on its outer periphery with a protrusion portion 40*b* that protrudes outward beyond a radially outer end of a washer 20 in a no-load state.

The seal member 340 has a back surface at the opposite side of its seal surface 341 attached or adhered to a bottom surface 24*a* of a recessed portion 24 by means of an adhesive material 343. In this case, too, an underfill portion 340*a* is formed in a radially inner end of the seal member 340 in order to prevent the radially inner end of the seal member 340 from biting during tightening. Since the seal member 340 is not molded, the underfill portion 340*a* does not take a complicated shape, and can be formed by a chamfered shape.

This form of the seal member 340 having an adhered structure is suitable for the case where materials are used that are difficult to mold.

Here, note that in this example, the adhesive material 343 is used, but if the material of the seal member 340 is a weldable material, it can be welded or mechanically bonded. Further, mechanical bonding may be combined with bonding by an adhesive material.

Here, note that in each of the above-mentioned embodiment and modifications, the recessed portion 24 is formed to have its outer side opened, but is not limited to such an opened structure and may have a recessed groove shape in which the outer side is not open. In addition, the head portion 2 has a special shape for holding a part, but it is not limited to such use for holding a part. Moreover, the caulking portion is described as one that is caulked at the same time as thread rolling, but it can also be formed by providing a stepped portion for caulking at the under-neck portion, and caulking it in the axial direction.

What is claimed is:

1. A threaded fastener comprising:
   a bolt having a head portion and a shank portion with a thread formed thereon;
   a washer fitted over the shank portion to come into contact with the head portion; and
   a seal member fixed to an outer peripheral side of the washer; wherein
   the washer has a bearing surface configured to contact a fastened member and a recessed portion formed to surround the bearing surface, an outer end portion of the washer adjacent to the recessed portion being in an exposed state, the recessed portion has a bottom surface and a step portion between the bottom surface and the bearing surface, the recessed portion is formed to have its outer side opened, the seal member is fixed to the bottom surface of the recessed portion, so that the seal member is configured to contact the fastened member in a water stop state, with the bearing surface configured to contact the fastened member, and the shank portion is provided with a caulking portion that is caulked and fixed to an entire opening portion peripheral edge of an inner periphery of the washer in a water stop state;
   the seal member is provided on its outer periphery with a protrusion portion that protrudes outward from a radially outer end of a fixed portion of the seal member fixed to the bottom surface of the recessed portion of the washer in a no-load state at the side of the fastened member opposite the outer end portion of the washer in the exposed state, wherein the radially outer end of the fixed portion of the seal member is located on a radially inner side with respect to the outer end portion of the washer; and
   the protrusion portion has a back surface at the opposite side of the fastened member, the back surface being an inclined surface that inclines in a direction to gradually increase in diameter toward a thread distal end and that extends from the radially inner side to a radially outer side across the outer end portion of the washer.

2. The threaded fastener according to claim 1, wherein the seal member is a water repellent member.

3. The threaded fastener according to claim 1, wherein the seal member is provided at its radially inner end portion with an underfill portion.

4. The threaded fastener according to claim 3, wherein the seal member has a fitting portion fitted into a fixing hole formed in the washer.

5. The threaded fastener according to claim 1, wherein the seal member is attached to the recessed portion of the washer by means of an adhesive material.

6. The threaded fastener according to claim 5, wherein the seal member is provided at its radially inner end portion with an underfill portion.

7. The threaded fastener according to claim 5, wherein a gap is provided between an inner periphery of the seal member and an outer periphery of the bearing surface of the washer.

8. The threaded fastener according to claim 1, wherein the seal member is provided with a plurality of concentric annular convex portions in a concentric manner, and heights of the plurality of annular convex portions for sealing are reduced stepwise from a radially outer end side toward a radially inner end side of the seal member.

9. The threaded fastener according to claim 8, wherein the seal member is provided at its radially inner end portion with an underfill portion.

10. The threaded fastener according to claim 8, wherein the seal member has a fitting portion fitted into a fixing hole formed in the washer.

11. The threaded fastener according to claim 8, wherein the seal member is attached to the recessed portion of the washer by means of an adhesive material.

12. The threaded fastener according to claim 1, wherein the seal member has a fitting portion fitted into a fixing hole formed in the washer.

13. The threaded fastener according to claim 12, wherein the fitting portion has its distal end located inside the fixing hole, or flush with a head side end surface of the washer.

14. The threaded fastener according to claim 12, wherein the fixing hole and the fitting portion are provided with slip-off preventing portions that engage with each other in a direction in which the fitting portion slips off from the fixing hole.

15. The threaded fastener according to claim 14, wherein the fitting portion has its distal end located inside the fixing hole, or flush with a head side end surface of the washer.

16. A threaded fastener comprising:
a bolt having a head portion and a shank portion with a thread formed thereon;
a washer fitted over the shank portion to come into contact with the head portion; and
a seal member fixed to an outer peripheral side of the washer; wherein
the washer has a bearing surface configured to contact a fastened member and a recessed portion formed to surround the bearing surface, an outer end portion of the washer adjacent to the recessed portion being in an exposed state, the recessed portion has a bottom surface and a step portion between the bottom surface and the bearing surface, the recessed portion is formed to have its outer side opened, the seal member is fixed to the bottom surface of the recessed portion, so that the seal member is configured to contact the fastened member in a water stop state, with the bearing surface configured to contact the fastened member, and the shank portion is provided with a caulking portion that is caulked and fixed to an entire opening portion peripheral edge of an inner periphery of the washer in a water stop state;
the seal member is provided on its outer periphery with a protrusion portion that protrudes outward from a radially outer end of a fixed portion of the seal member fixed to the bottom surface of the recessed portion of the washer in a no-load state at the side of the fastened member opposite the outer end portion of the washer in the exposed state, wherein the radially outer end of the fixed portion of the seal member is located on a radially inner side with respect to the outer end portion of the washer;
the protrusion portion has a back surface at the opposite side of the fastened member, the back surface being an inclined surface that inclines in a direction to gradually increase in diameter toward a thread distal end and that extends from the radially inner side to a radially outer side across the outer end portion of the washer; and
the seal member is provided at its radially inner end portion with an underfill portion adjacent to the bearing surface, the underfill portion having an annular groove shape recessed from the bearing surface of the washer and including an annular groove bottom portion recessed relative to the bearing surface, an inner peripheral side inclined surface, and an outer peripheral side inclined surface.

17. The threaded fastener according to claim 16, wherein the inner peripheral side inclined surface extends from the groove bottom portion to a radially outer end of the bearing surface while being inclined so as to be gradually displaced inward toward the distal end side of the shank portion, and
the outer peripheral side inclined surface is inclined so as to be gradually opened outward toward the distal end of the shank portion.

* * * * *